United States Patent [19]

Menovcik et al.

[11] Patent Number: 5,976,615
[45] Date of Patent: Nov. 2, 1999

[54] CARBAMATE CURABLE COATING COMPOSITION AND METHOD FOR IMPROVED ADHESION

[75] Inventors: Gregory G. Menovcik, Farmington Hills; John G. Partyka, Brighton; Aimee R. Barach, Clinton; Sanjay Mehta, Rochester Hills, all of Mich.

[73] Assignee: BASF Corporation, Southfield, Mich.

[21] Appl. No.: 08/890,501

[22] Filed: Jul. 9, 1997

[51] Int. Cl.[6] .............................. B05D 1/36; B05D 7/16; B05D 7/24

[52] U.S. Cl. .................. 427/140; 427/142; 427/407.1; 427/410; 524/539; 524/590; 524/591; 524/598; 525/127; 525/157; 525/374; 525/443; 525/450; 525/509; 525/518; 525/519; 526/301; 528/272; 528/288

[58] Field of Search .................. 427/409, 410, 427/407.1, 385.5, 386, 388.3, 379, 140, 142; 524/539, 590, 591, 598; 525/450, 518, 127, 157, 374, 443, 414, 415, 519, 509; 528/288, 272; 526/301

[56] References Cited

U.S. PATENT DOCUMENTS

| | | | |
|---|---|---|---|
| 5,356,669 | 10/1994 | Rehfuss et al. | 427/409 |
| 5,451,656 | 9/1995 | Menovcik et al. | 528/288 |
| 5,552,497 | 9/1996 | Taylor et al. | 525/456 |
| 5,576,063 | 11/1996 | Briggs et al. | 427/386 |
| 5,576,406 | 11/1996 | Yamamura et al. | 427/409 |
| 5,639,828 | 6/1997 | Briggs et al. | 525/208 |
| 5,663,244 | 9/1997 | Barancyk et al. | 427/385.5 |
| 5,759,694 | 6/1998 | Mayo et al. | 428/423.1 |
| 5,777,048 | 7/1998 | Ohrbom et al. | 525/509 |
| 5,798,145 | 8/1998 | Barancyk et al. | 427/393.5 |
| 5,820,925 | 10/1998 | Fenn et al. | 427/140 |
| 5,852,136 | 12/1998 | Green | 525/456 |

*Primary Examiner*—Diana Dudash
*Attorney, Agent, or Firm*—Anne Gerry Sabourin

[57] ABSTRACT

A curable coating composition is described comprising a carbamate functional material and a crosslinking agent, reactive with the carbamate group. The composition further comprises a third component that is a mixture of catalysts including a phosphorus containing acid or acid derivative and other acid catalysts. Coatings prepared with this coating composition can be cured and coated with additional coating (s), providing good intercoat adhesion to the subsequent coating.

18 Claims, No Drawings

CARBAMATE CURABLE COATING COMPOSITION AND METHOD FOR IMPROVED ADHESION

FIELD OF THE INVENTION

This invention relates to curable coating compositions, comprising a carbamate material, crosslinking agent reactive therewith and a catalyst mixture wherein at least one of the catalysts is a phosphorus containing acid or acid derivative, for coatings for use in multilayer coatings.

BACKGROUND OF THE INVENTION

Coating compositions are often divided into thermoplastic and thermoset. Thermoplastic coating compositions utilize high molecular weight polymers dispersed in an organic or aqueous solvent. After the coating composition is applied to a substrate, the solvent is removed and the polymers set up to form a film. Thermoset or curable coating compositions utilize two components that are reactive with one another under certain cure conditions. The reactive groups on these components are referred to as 'functional groups'. After the composition containing these components is applied, the coated substrate is subjected to cure conditions, causing the functional groups to react and form a cured film of a crosslinked matrix.

Various combinations of functional groups have been used in the art for curable coating compositions. One widely used combination utilizes OH-functional groups and the alkylol groups on aminoplast resins. These functional groups react to form ether bridges in the crosslinked coating. Another combination utilizes acid functional groups and epoxy functional groups, which react to form ester bridges in the crosslinked coating.

Curable coating compositions that cure via the formation of urethane bridges in the crosslinked coating have also been used in the art. Urethane bonds are often desirable for their durability, resistance to attack by various agents in the environment, impact resistance, and other physical properties such as stress release. Urethane bridges can be formed by various combinations of functional groups, such as OH functional groups and isocyanate functional groups, carbamate groups and aminoplast resins, or cyclic carbonate groups and amino groups.

In many coating applications, it is often necessary to apply an additional coating on top of an already-cured coating. This may be done to achieve certain visual or physical properties, or it may be necessary to repair areas where the cured coating has been damaged or where coating defects exist. In such cases, it is important that the coating applied on top of the cured coating have adequate adhesion to the cured coating. Even when the cured coating is sanded prior to application of the additional coating, the adhesion factor is still a concern with regard to overspray areas onto unsanded coating surfaces.

Intercoat adhesion can be of particular concern with regard to cured urethane coatings. Accordingly, the present invention is directed toward such a curable coating composition having good intercoat adhesion properties.

Additionally, it is necessary to promote and/or improve adhesion of sealant materials to the basecoat and/or the clearcoat coating composition, such as where windshield sealants are applied to a cured coating. Accordingly, the present invention is directed toward a cured coating composition having good adhesion to sealants.

SUMMARY OF THE INVENTION

The present invention provides a curable coating composition comprising (A) a polymer comprising a plurality of carbamate groups,
(B) a component comprising a plurality of groups that are reactive with the carbamate groups on component (A), and
(C) a mixture of acid catalysts, wherein at least one of the catalysts is a phosphorus containing acid or phosphorus containing acid derivative.

Coatings prepared with this coating composition can be cured and coated with additional coating(s), providing good intercoat adhesion to the subsequent coating and to surface sealants.

The invention further comprises a method for improved intercoat adhesion comprising applying to a substrate at least a basecoat layer and a clearcoat layer, wherein at least one layer of the coating composition comprises components (A)–(C).

The invention further comprises a method for improved adhesion of sealants to a cured coating composition.

DESCRIPTION OF THE PREFERRED EMBODIMENTS

The present invention may include as the carbamate functional material, materials described in WO 94/10211 and U.S. Pat. No. 5,356,669, the disclosures of which are incorporated herein by reference.

A carbamate-functional polymer may be used as the carbamate-functional material in the practice of the present invention. Carbamate-functional polymer components used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing carbamate-functional polymers is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing carbamate-functional polymers involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A preferred approach is a transcarbamylation or transesterification reaction of a hydroxy-functional polymer with an alkyl carbamate or hydroxyalkyl carbamate. A more difficult, but feasible way of preparing the polymer would be to trans-esterify an acrylate polymer with a hydroxyalkyl carbamate.

Other polymers may be used as well. For example, a carbamate-functional polyurethane can be prepared as is described in U.S. patent application Ser. No. 08/098,169, the disclosure of which is incorporated herein by reference. A carbamate-functional polyester can be prepared as described in JP 51/4124, the disclosure of which is incorporated herein by reference.

Carbamate-functional polymers can have a molecular weight of 2000–20,000, and preferably from 4000–6000. Molecular weight as used herein means weight average molecular weight, and can be determined by the GPC method using a polystyrene standard. The carbamate content of the polymer, on a molecular weight per equivalent of carbamate functionality, will generally be between 200 and 1500, and preferably between 300 and 500.

One class of carbamate-functional polymer component can be represented by randomly repeating units according to the following formula:

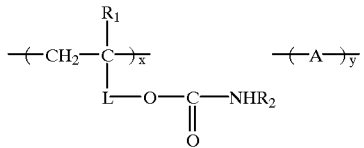

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the above formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

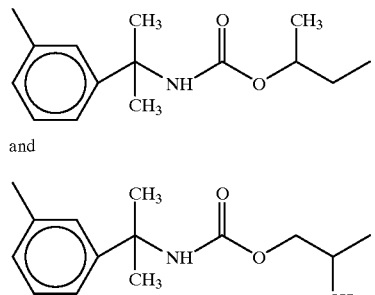

and

—$(CH_2)$—, —$(CH_2)_2$—, —$(CH_2)_4$—, and the like. In one preferred embodiment, —L— is represented by —COO—L'— where L' is a divalent linking group. Thus, in a preferred embodiment of the invention, the carbamate-functional polymer component is represented by randomly repeating units according to the following formula:

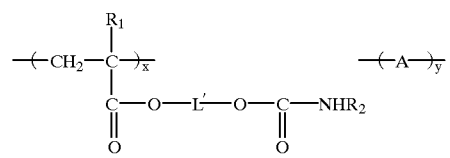

In this formula, $R_1$, $R_2$, A, x, and y are as defined above. L' may be a divalent aliphatic linking group, preferably of 1 to 8 carbon atoms, e.g., —$(CH_2)$—, —$(CH_2)_2$—, —$(CH_2)_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

Lower molecular weight carbamate-functional materials, such as oligomeric or non-polymeric materials may also be used in the practice of the present invention. Such compounds can be prepared in a variety of ways.

One way to prepare such carbamate-functional materials is to react an alcohol ('alcohol' is defined herein as having one or more OH groups) with a urea to form a compound with carbamate group(s). This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful in the practice of the invention. They generally have from 1 to 160 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Another approach is to react an isocyanate (preferably a diisocyanate, e.g., HDI, IPDI) with a compound such as hydroxypropyl carbamate to form a carbamate-capped polyisocyanate derivative as described in U.S. patent application Ser. No. 08/098,176. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and aliphatic diisocyanates include the various isomers of toluene diisocyanate, meta-xylenediioscyanate and para-xylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of α,α,α',α'-tetramethyl xylene diisocyanate can be used. Biurets of isocyanates such as DESMODUR® N-100 from Mobay may also be useful.

In one embodiment of the invention, a polyisocyanate is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on a polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional adduct (which can be formed by reacting a polyisocyanate with an amino alcohol) can be reacted with the oxygen of a COO portion of the carbamate group or an alkyl carbamate or with the methylol group of methylol acrylamide ($HO-CH_2-NH-CO-CH=CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide to form an epoxy group. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxyalkylcarbamate.

The above-described polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

Non-polymeric or oligomeric carbamate-functional compounds will generally have a molecular weight of 75–2000, and preferably from 75–1500. As used herein, molecular weight means weight average molecular weight. Molecular weight can be determined by the GPC method.

Mixtures of the polymeric and non-polymeric or oligomeric carbamate functional compounds may also be utilized in the coating composition of the present invention.

A number of materials can be used as the crosslinking agent to react with carbamate to form a urethane linkage as defined above. These include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), phenol/formaldehyde adducts, and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. Pat. No. 5,300,328.

In a preferred embodiment, the composition of the present invention also comprises a component that includes one or more epoxide groups. Epoxides are well-known in the art. The epoxide may be of the general formula:

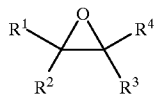

where $R_1$, $R_2$, $R_3$, and $R_4$ are each independently H (with the proviso that at least one of R1–R4 is other than H), an organic radical, which may be polymeric or non-polymeric and may contain unsaturation and/or heteroatoms, or one of R1 or R2 together with one of R3 or R4 may form a cyclic ring, which may contain unsaturation and/or heteroatoms.

Although essentially any epoxide can be used in the practice of the present invention, the epoxide is preferably substantially free of groups that are reactive with either of the two components that are reactive with one another to form urethane linkages. By 'substantially free' of such groups, it is meant that the degree of reaction between either of the two components that are reactive to form urethane linkages and any reactive component on the epoxide is sufficiently low so as to avoid any undesired adverse impact on the intercoat adhesion properties of the coating.

Useful epoxides can be prepared from alcohols, e.g., butanol, trimethylol propane, by reaction with an epihalohydrin (e.g., epichlorohydrin), or by reaction of an allyl group with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate or polymer or oligomer with glycidol. Other known polyepoxides, e.g., epoxy-novolacs, may also be used.

In one preferred embodiment, the epoxide is an acrylic-containing polymer or oligomer, preferably deriving its epoxy groups from glycidyl methacrylate monomer, glycidyl acrylate, allyl glycidyl ether, cyclohexyl monoepoxy methacrylate, the epoxide of the dimer of cylopentadiene methacrylate, or epoxidized butadiene, more preferably glycidyl methacrylate. In another preferred embodiment, both the epoxy-containing component and one of the components that reacts to form urethane linkages are acrylic polymers or oligomers. The epoxide is preferably present in the coating composition in an amount of from 0.0001 to 0.05 equivalents of epoxy per 100 g of resin.

In one preferred embodiment of the invention, one of the components that are curable to form urethane linkages is an acrylic resin, and the component that includes one or more epoxy groups is an epoxy acrylic resin. Such an epoxy acrylic resin preferably includes one or more of the components lauryl methacrylate, 2-ethylhexyl acrylate, 2-ethylhexyl methacrylate, or butyl acrylate. The epoxy equivalent weight, molecular weight, and glass transition temperature of the epoxy acrylic resin are adjusted by varying the monomer lineup to optimize the performance in the particular coating composition by techniques known in the art.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to all of the components in the composition. In general, depending on the solubility characteristics of various components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention includes, a catalyst mixture to enhance the cure reaction and to improve intercoat adhesion between clearcoat and basecoat coating layers and to improve the adhesion of a sealant to a cured coating composition. In a preferred embodiment of the invention the catalyst mixture includes a phosphorus containing acid or phosphorus containing acid derivative, having an acid number between 200 and 900, present in an amount between 0.5 and 95.5% of the total catalyst mixture. The phosphate catalyst may be blocked or unblocked. Examples of such catalysts include pyrophosphates, esters of phosphoric acid including, but not limited to phenyl acid phosphate, and alkyl acid phosphates having an alkyl chain of 1 to 8 carbon atoms in length. The catalyst mixture also includes additional catalyst such as sulfonic acids including, but not limited to, dodecyl benzene sulfonic acid, p-toluenesulfonic acid, dinonylnaphthalene disulfonic acid, and Lewis acids.

In the preferred embodiment, the catalyst mixture includes blocked or unblocked phenyl acid phosphate and blocked or unblocked dodecylbenzenesulfonic acid. The total catalyst mixture is present in an amount between 0.25 and 5.0 percent by weight based on total coating composition weight, where the preferred range is 1.0 to 3.0 percent by weight, based on total coating composition weight.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition of the invention may be clear or it may be a pigmented paint coating. When it is pigmented, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components in the coating composition (i.e., a P:B ratio of 0.1 to 1).

The coating composition of the present invention provides enhanced intercoat adhesion whether the catalyst mixture is used in the basecoat or clearcoat layer. The catalyst mixture may be used in both layers, but may not be practical due to added cost.

In one preferred embodiment, the coating composition containing the catalyst mixture according to the invention is used as the clearcoat of a composite color-plus-clear coating. Pigmented basecoat compositions useful therewith include any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers.

The present invention further comprises a method for improving intercoat adhesion of a multilayer coating composition. The method comprises applying to a substrate, a layer of a basecoat composition, followed by application of a layer of a clearcoat coating composition, wherein at least one of the coating compositions comprises (A) a polymer comprising a plurality of carbamate groups, (B) a component comprising a plurality of groups that are reactive with the carbamate groups on component (A), and (C) a catalyst mixture wherein at least one of the catalysts is a phosphorus containing acid or phosphorus containing acid derivative. The substrate to be coated may be primed or unprimed. If unprimed, the substrate may be may be untreated or may be treated, such as by phosphate treatment. The basecoat composition is applied at a thickness of between 0.3 and 1.5 mils, where the preferred range is 0.5 to 1.2 mils. The clearcoat composition is generally applied at a thickness of up to 2.5 mils. The thickness may range from 0 to 2.4 mils, where 0 represents overspray of the clearcoat. Preferably, the clearcoat is applied at a thickness of above 1.2 mils and more preferably from 1.4 to 2.0 mils. Improved intercoat adhesion was found, within these ranges of film thickness, when at least one layer of the coating contained the catalyst mixture including a phosphorus containing acid or acid derivative.

Coating compositions can be coated on the article by any of a number of techniques well-known in the art. These include, for example, spray coating, dip coating, roll coating, curtain coating, and the like. For automotive body panels, spray coating is preferred.

Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 82° C. and 177° C. The curing time will vary depending on the particular components used, and physical parameters such as the thickness of the layers, however, typical curing times range from 15 to 60 minutes.

An additional advantage was found in clearcoat compositions containing the catalyst mixture with the phosphorus containing acid or acid derivative, in that the addition of the catalyst mixture reduced yellowing of the clearcoat.

The invention is further described in the following non-limiting examples.

EXAMPLES

Basecoat Preparation

Silver basecoat compositions were prepared having the following formulations. Weights are set forth in percent by weight based on total coating composition weight.

| INGREDIENT | CONTROL | Invention -A- | Invention -B- |
| --- | --- | --- | --- |
| alkoxylated melamine resin A | 13.28 | 13.34 | 13.29 |
| alkoxylated melamine resin B | 5.82 | 5.85 | 5.83 |
| Cellulose acetate butyrate solution | 4.42 | 4.45 | 4.43 |
| alkoxylated melamine resin C | 2.46 | 2.48 | 2.47 |
| Denatured ethyl alcohol 88% | 3.65 | 3.68 | 3.66 |
| Non-aqueoous disperson microgel resin | 15.11 | 15.18 | 15.12 |
| n-methyl pyrolidone | 2.01 | 2.02 | 2.01 |
| UV absorber solution | 2.40 | 2.41 | 2.40 |
| Tinuvin ® 1130 | 0.72 | 0.72 | 0.72 |
| Lindron ® 22 acrylic polymer | 0.08 | 0.09 | 0.09 |
| oxohexyl acetate- Exxate ® 600 | 6.71 | 6.74 | 6.71 |
| Magnesium silicate dispersion | 4.56 | 4.58 | 4.56 |
| Rheological agent dispersion | 5.81 | 5.84 | 5.81 |
| White pigment dispersion, Type I | 0.93 | 0.94 | 0.94 |
| Flexible acrylic resin | 18.91 | 18.99 | 18.93 |
| Nacure ® 5225 Blocked DDBSA catalyst | 1.69 | 1.14 | 1.35 |
| Nacure ® 4575 Blocked PAP catalyst | 0.00 | 0.00 | 0.30 |
| Nacure ® XP-333 Unblocked PAP catalyst | 0.00 | 0.15 | 0.00 |
| Aluminium slurry-type I | 7.13 | 7.17 | 7.14 |
| Aluminium slurry-type II | 4.16 | 4.18 | 4.17 |
| White pigment dispersion | 0.04 | 0.05 | 0.05 |

Clearcoat Preparation

Clearcoat compositions were prepared having the following formulations. Amounts are set forth in percent by weight based on total coating composition weight.

| Ingredient | Control | Invention A | Invention B |
| --- | --- | --- | --- |
| Exxate 600 ® | 1.55 | 2.96 | 1.56 |
| UV solution ® | 8.75 | 8.45 | 8.75 |
| Carbamate functional acrylic resin | 52.72 | 50.95 | 52.73 |
| Resimene 747 ® melamine resin | 7.90 | 7.63 | 7.91 |
| Reactive intermediate | 12.88 | 12.45 | 12.89 |
| Lindron 22 ® acrylic polymer | 0.11 | 0.10 | 0.11 |
| GMA acrylic resin | 1.04 | 1.00 | 1.04 |
| Tinuvin 123 ® | 0.83 | 0.80 | 0.84 |
| n-methyl pyrolidone | 0.54 | 0.52 | 0.52 |
| BYK 405 ® | 0.11 | 0.10 | 0.11 |
| Tinuvin 400 ® | 0.55 | 0.53 | 0.56 |
| Octanoic acid | 0.30 | 0.29 | 0.30 |
| Nacure XC-6206 ® acid catalyst | 2.22 | 2.15 | 0.0 |
| Nacure 4575 ®, Blocked PAP catalyst | 0.00 | 0.43 | 0.0 |
| X-333, Unblocked PAP Catalyst | 0.0 | 0.0 | 1.27 |
| Rheological agent dispersion, type I | 4.22 | 4.08 | 4.23 |
| Rheological agent dispersion, type II | 5.63 | 5.44 | 5.64 |
| Methyl 2 hexanone | 0.55 | 2.00 | 0.56 |

Reprocess

A silver basecoat composition was coated onto a primed steel panel as the basecoat of a basecoat/clearcoat composite coating at a thickness at about 1.0 mil. Clearcoat was subsequently applied at varying thicknesses of 0 to 2.0 mils. The panels were partially cured wet on wet at a metal temperature of 124° C. for 15 minutes. A second basecoat layer of 1.0 mil and a second clearcoat layer of 2.0 mils were applied and baked for 15 minutes at 124° C., followed by curing wet on wet, for 15 minutes at 132.0° C.

The panels were then subjected to an adhesion test as described in ASTM 3359 involving scribing a portion of the coating with a cross-cut pattern and applying and removing pressure-sensitive adhesive tape. The panels were evaluated for pass/fail with a pass representing 10% or less of the second base/clear coating being removed during the test and a fail being greater than 10% of the second base/clear coating being removed during the test.

Intercoat Adhesion (ICA) III Test

The panels were processed and tested as described above for Reprocess, except the first base/clear coat was cured for 25 minutes at 149° C. and the second base/clear coat was cured for 10 minutes at 129° C.

Intercoat Adhesion (ICA) IV Test

The panels were processed and tested as described for the Reprocess test, except the first base/clear coat was cured for 50 minutes at 149° C. and the second base/clear coat was cured for 10 minutes at 129° C.

The results are described in Table I below:

TABLE I

| Preparation | Reprocess | ICA III | ICA IV |
| --- | --- | --- | --- |
| control base and clear | Fail | Clear Fails at 1.1 mils and below | Clear Fails at 0.9 mils and below |
| basecoat a/ control clear | Pass | Clear Passes above 0.2 mils | Clear Passes above 0.4 mils |
| basecoat b/ control clear | Pass | Pass | n/a |
| control base/ clear A | Pass | Clear Passes above 0.4 mils | Clear Passes above 0.4 mils |
| control base/ clear B | Pass | n/a | n/a |

The invention has been described in detail with reference to preferred embodiments thereof. It should be understood, however, that variations and modifications can be made within the spirit and scope of the invention.

What is claimed is:

1. A curable coating composition consisting essentially of
   (A) an acrylic polymer comprising a plurality of carbamate groups,
   (B) a component comprising a plurality of groups that are reactive with the carbamate groups on component (A),
   (C) a catalyst mixture, consisting of phosphorus containing acid or phosphorus containing acid derivative and sulfonic acid or substituted sulfonic acid, and
   (D) a component including one or more epoxide groups and which is substantially free of groups that are reactive with components (A) and (B).

2. A curable coating composition according to claim 1 wherein component (C) has an acid number between 100 and 900.

3. A curable coating composition according to claim 1 further comprising a carbamate functional material having a weight average molecular weight between 75 and 2000.

4. A curable coating composition according to claim 1 wherein the catalyst mixture comprises from 0.5 to 99.5% by weight of a phosphorus containing acid or phosphorus containing acid derivative, based on total weight of the acid catalyst mixture.

5. A curable coating composition according to claim 1 wherein (C) the mixture of catalysts comprises blocked or unblocked phenyl acid phosphate.

6. A curable coating composition according to claim 1 wherein the mixture of acid catalysts comprises blocked or unblocked phenyl acid phosphate and a catalyst selected from the group consisting of dodecylbenzene sulfonic acid, p-toluenesulfonic acid, dinonylnapthalene disulfonic acid, and Lewis Acids, wherein said catalysts are blocked or unblocked.

7. A curable coating composition according to claim 1 wherein the catalyst mixture comprises blocked or unblocked phenyl acid phosphate and blocked or unblocked dodecylbenzene sulfonic acid.

8. A curable coating composition according to claim 1 wherein the epoxide containing component comprises epoxide groups derived from glycidyl methacrylate, glycidyl acrylate, allyl glycidyl ether, cyclohexyl monoepoxy methacrylate, the epoxide of the dimer of cyclopentadiene methacrylate, and epoxidized butadiene.

9. A curable coating composition according to claim 1 wherein component (B) is an aminoplast resin.

10. A curable coating composition according to claim 1 wherein component (B) is a melamine formaldehyde resin.

11. A method for repair of a coating providing good intercoat adhesion comprising
   (a) applying to a substrate a basecoat coating composition to form a basecoat layer and a clearcoat composition to form a clearcoat layer and curing the coatings simultaneously or sequentially and
   (b) applying over the basecoat and clearcoat layers at least one additional coatings consisting essentially of
      (i) an acrylic polymer comprising a plurality of carbamate groups,
      (ii) a component comprising a plurality of groups that are reactive with the carbamate groups on component (A),
      (iii) a component including one or more epoxide groups and which is substantially free of groups that are reactive with components (i) and (ii) and
      a catalyst mixture, consisting of a phosphorus containing acid or a phosphorus containing acid derivative and sulfonic acid or a substituted sulfonic acid catalyst.

12. A method according to claim 11 wherein the acid catalyst has an acid number between 100 and 900.

13. A method according to claim 11 wherein the curable coating composition further comprises a carbamate functional material having a weight average molecular weight between 75 and 2000.

14. A method according to claim 11 wherein the curable coating composition comprises a mixture of catalysts including from 0.5 to 99.5% by weight of the phosphorus containing acid or phosphorus containing acid derivative, which may be blocked or unblocked.

15. A method according to claim 14 wherein the sulfonic acid catalyst is selected from the group consisting of blocked and unblocked dodecylbenzene sulfonic acid, p-toluenesulfonic acid, and dinonylnapthalene disulfonic acid.

16. A method according to claim 11 wherein the coating comprises as component (iv) a mixture of blocked or unblocked phenyl acid phosphate and blocked or unblocked dodecylbenzene sulfonic acid.

17. A method according to claim 11 wherein the coating composition comprises as component (ii) an aminoplast resin.

18. A method according to claim 11 wherein the coating composition comprises as component (ii) a melamine formaldehyde resin.

* * * * *